United States Patent
Colehour et al.

(10) Patent No.: US 11,828,396 B1
(45) Date of Patent: Nov. 28, 2023

(54) GAS LINE SUPPORT CLIP WITH WIRE PASSAGE

(71) Applicants: BSH Home Appliances Corporation, Irvine, CA (US); BSH Hausgeräte GmbH, Munich (DE)

(72) Inventors: Robert Colehour, Knoxville, TN (US); Charles Hanna, Knoxville, TN (US); James Russell, Knoxville, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 0 days.

(21) Appl. No.: 17/849,782

(22) Filed: Jun. 27, 2022

(51) Int. Cl.
*F16L 3/06* (2006.01)
*F24C 3/12* (2006.01)
*F16L 3/22* (2006.01)

(52) U.S. Cl.
CPC ............... *F16L 3/06* (2013.01); *F24C 3/126* (2013.01); *F16L 3/222* (2013.01)

(58) Field of Classification Search
CPC ... F16L 3/237; F16L 3/222; F16L 3/06; F16L 3/1091; F16L 3/13; F16L 3/123; F16L 3/22; F16L 3/2235; F16L 3/04
USPC .................................................. 248/49–74.5
See application file for complete search history.

(56) References Cited

U.S. PATENT DOCUMENTS

| | | | | |
|---|---|---|---|---|
| 2,963,539 A | * | 12/1960 | Hynes ..................... | H05B 3/66 174/157 |
| 3,523,667 A | * | 8/1970 | Guerrero ................. | F16L 3/222 248/68.1 |
| 3,856,246 A | * | 12/1974 | Sinko ..................... | F16L 3/222 403/294 |
| 4,618,114 A | * | 10/1986 | McFarland ............. | F16L 3/222 248/65 |
| 5,104,072 A | * | 4/1992 | Kuo ....................... | F16L 3/2235 248/222.12 |

(Continued)

OTHER PUBLICATIONS

Cable Spacer, Panduit Corp., Online: FrommElectric.com, Mar. 19, 2013.

(Continued)

*Primary Examiner* — Christopher Garft
(74) *Attorney, Agent, or Firm* — Michael E. Tschupp; Andre Pallapies; Brandon G. Braun

(57) ABSTRACT

A gas line support device configured to support a gas line in a domestic home appliance includes: a base, the base having a plurality of contact portions that are configured to rest on a surface in a chassis of the domestic home appliance; a central portion having a first end and a second end opposite the first end, the central portion being attached to the base at the first end of the central portion; a gas line cradle attached to the second end of the central portion, the gas line cradle being configured to support a gas line in the domestic home appliance; a passage in the base, the passage being formed between two of the contact portions of the base and being configured to receive an electrical wire such that the electrical wire passes through the passage and below the gas line cradle; and an attachment portion extending from one of the contact portions of the base, the attachment portion being configured to attach the gas line support device to the surface.

13 Claims, 7 Drawing Sheets

(56) References Cited

U.S. PATENT DOCUMENTS

| | | | | |
|---|---|---|---|---|
| 5,112,031 A | * | 5/1992 | Hynds | B60G 21/0551 |
| | | | | 248/222.12 |
| 6,710,249 B1 | | 3/2004 | Denton | |
| 6,855,889 B2 | | 2/2005 | Gareis | |
| 2003/0089829 A1 | * | 5/2003 | Brandzel | F16L 3/222 |
| | | | | 248/68.1 |

OTHER PUBLICATIONS

Clamps, Brennan Industries, Inc., Online: BrennanInc.com, 2017.
Steel pipe clamps, Younglee Metal Products Group, Online: Sino-Alloy.com, Unknown. Accessed Dec. 15, 2020.
Hose Separator Clamp Fitting, Online: DHGate.com, Unknown. Accessed Dec. 16, 2020.
Dual Swivel Saddle Spacer, HellermanTyton, Online: PowerAndSignal.com, Jul. 2011.
Wire and Hose Swivel Clip Ties, HellermanTyton, Online: PowerAndSignal.com, Jul. 2011.
Nylon Two Line Heater Hose Separator, Squeeg's Kustoms, Online: SqueegsKustoms.com, 2019 (copyright date on website).

* cited by examiner

GAS LINE SUPPORT CLIP WITH WIRE PASSAGE

FIELD OF THE INVENTION

The invention is directed to a gas line support structure for a kitchen appliance. More particularly, embodiments of the invention are directed to a clip that supports a gas line and provides a passage for wires below the gas line in a cooking appliance.

An example of an application for the invention is a gas stove or range having both a gas line and electrical wires in the same cavity.

BACKGROUND OF THE INVENTION

Some kitchens include a gas cooking appliance such as a cook top or an oven. In some cases, the gas cooking appliance has a gas line that supplies gas to a manifold and/or one or more gas burners. In some case, the gas cooking appliance has one or more electrical wires that provide power and/or control signals to various devices in the cooking appliance.

Applicants recognized an improvement to the above arrangement and implement that improvement in embodiments of the invention.

SUMMARY

In gas cooking appliances, there can be a concern about electrical wires rubbing on a gas line during transport of the appliance, or other times. This rubbing can potentially cause electrical energy arcing in the gas line. As gas appliances become more complicated and require more electronic devices and controls, significantly more wires can be introduced into areas of the appliance that contain gas lines. This results in cases where gas lines and electrical wires cross each other. Such gas appliances would benefit from a mechanical separator that eliminates the possibility of contact between the gas line and the electrical wires.

The invention achieves the benefit of separating a gas line from electrical wires to prevent contact between the gas line and the electrical wires. By preventing contact between the gas line and the electrical wires, damage to either the gas line or the electrical wires from such contact is prevented. Further, the potential for energy arcing in the gas line is reduced or eliminated by eliminating contact between the gas line and the electrical wires. Embodiments of the invention employ a support clip to support a gas line above, and separate the gas line from, electrical wires that cross the path of the gas line. In addition to preventing the above-described contact, embodiments of the invention can help prevent warping and/or twisting of the gas line during assembly of the appliance. Further, embodiments of the invention help locate the electrical wires and control the routing of the electrical wires along a chassis of the appliance.

Particular embodiments of the invention are directed to a gas line support device configured to support a gas line in a domestic home appliance. The gas line support device includes: a base, the base having a plurality of contact portions that are configured to rest on a surface in a chassis of the domestic home appliance; a central portion having a first end and a second end opposite the first end, the central portion being attached to the base at the first end of the central portion; a gas line cradle attached to the second end of the central portion, the gas line cradle being configured to support a gas line in the domestic home appliance; a passage in the base, the passage being formed between two of the contact portions of the base and being configured to receive an electrical wire such that the electrical wire passes through the passage and below the gas line cradle; and an attachment portion extending from one of the contact portions of the base, the attachment portion being configured to attach the gas line support device to the surface.

Other embodiments of the invention are directed to a domestic home appliance having: a chassis; a gas burner mounted to the chassis; a gas supply line configured to supply a gas to the gas burner; a gas line support device configured to support the gas line in the domestic home appliance; and an electrical wire extending through the passage and below the gas line cradle. The gas line support device includes: a base, the base having a plurality of contact portions that rest on a surface in the chassis of the domestic home appliance; a central portion having a first end and a second end opposite the first end, the central portion being attached to the base at the first end of the central portion; a gas line cradle attached to the second end of the central portion, the gas line cradle supporting the gas line in the domestic home appliance; a passage in the base, the passage being formed between two of the contact portions of the base; and an attachment portion extending from one of the contact portions of the base, the attachment portion attaching the gas line support device to the surface.

BRIEF DESCRIPTION OF THE DRAWINGS

The following figures form part of the present specification and are included to further demonstrate certain aspects of the disclosed features and functions and should not be used to limit or define the disclosed features and functions. Consequently, a more complete understanding of the exemplary embodiments and further features and advantages thereof may be acquired by referring to the following description taken in conjunction with the accompanying drawings, wherein.

DETAILED DESCRIPTION

The invention is described herein with reference to the accompanying drawings in which exemplary embodiments of the invention are shown. The invention may, however, be embodied in many different forms and should not be construed as limited to the embodiments set forth herein.

As explained above, embodiments of the invention provide an improvement to a gas appliance that includes a gas line and electrical wires. Embodiments of the invention employ a support clip to support a gas line above, and separate the gas line from, electrical wires that cross the path of the gas line.

Figure 1:
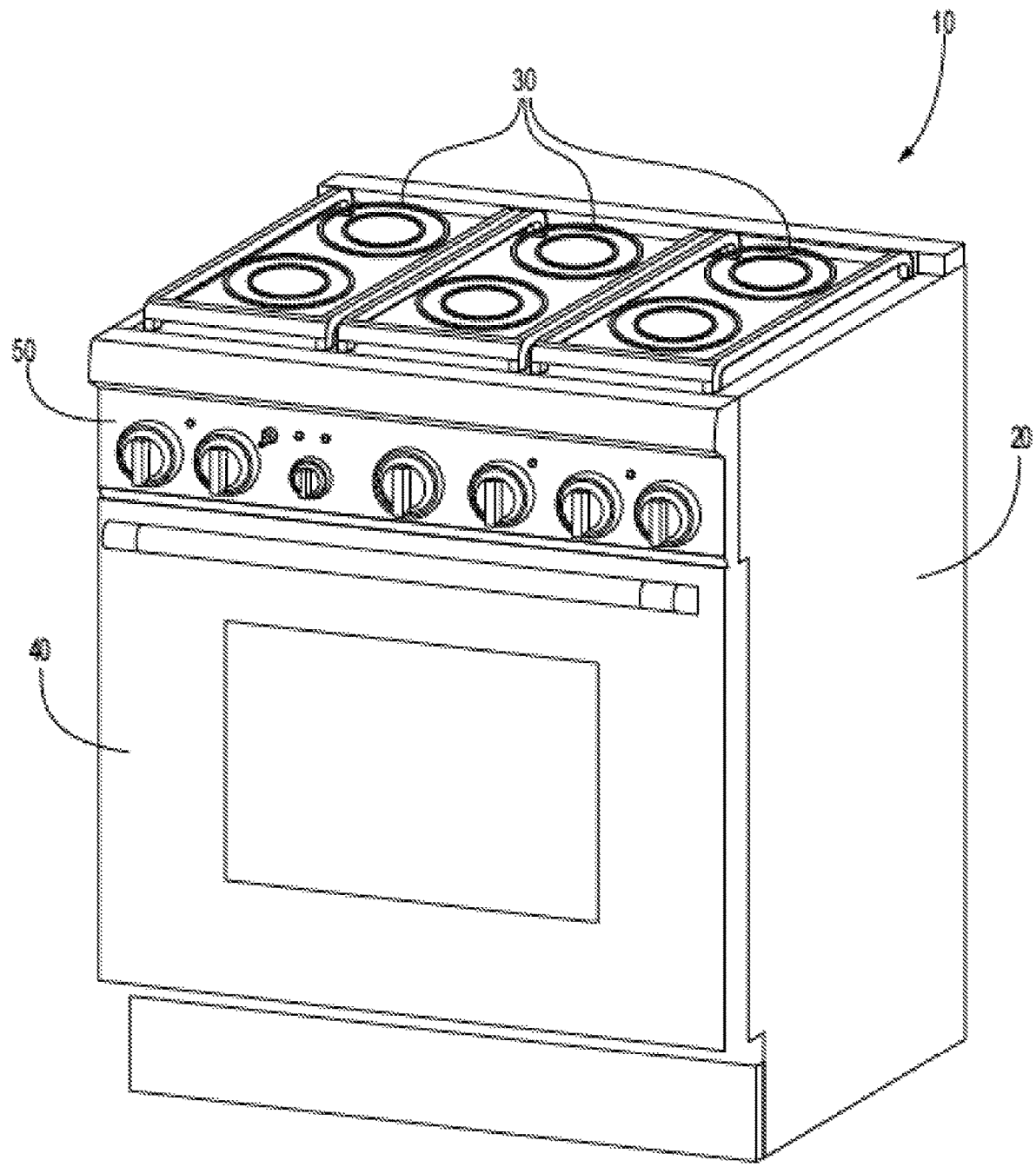
FIG. 1 is a perspective view of an exemplary cooking appliance in accordance with embodiments of the invention.

FIG. 1 shows a domestic home appliance 10 which is, in this example, a range having a housing 20, a plurality of gas burners 30, a cooking chamber door 40, and a control panel 50. Embodiments of the invention are applicable to other domestic home appliances that have gas burners.

Figure 2:
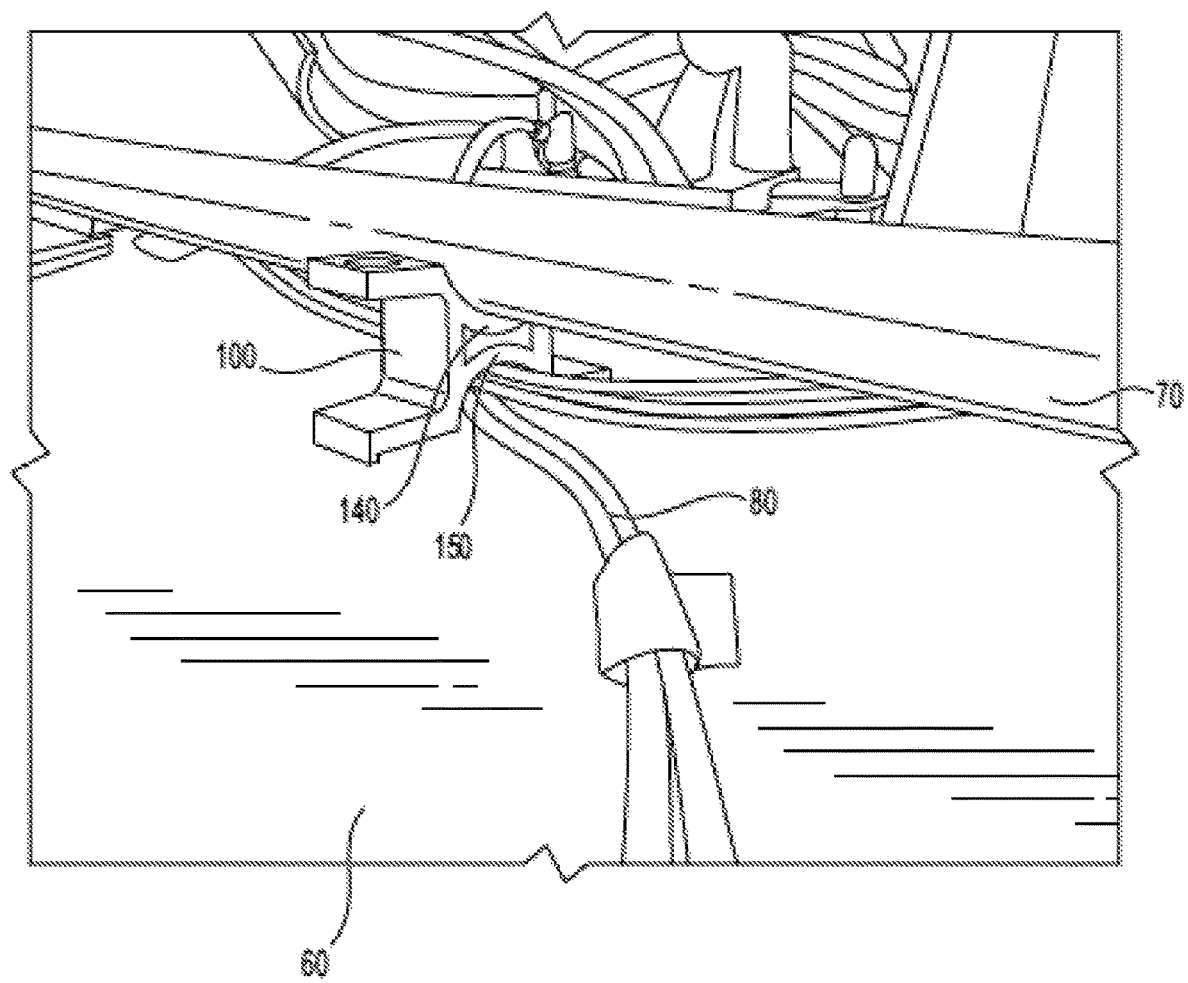
FIG. 2 is a perspective view of a support clip in accordance with embodiments of the invention in use.
Figure 3:
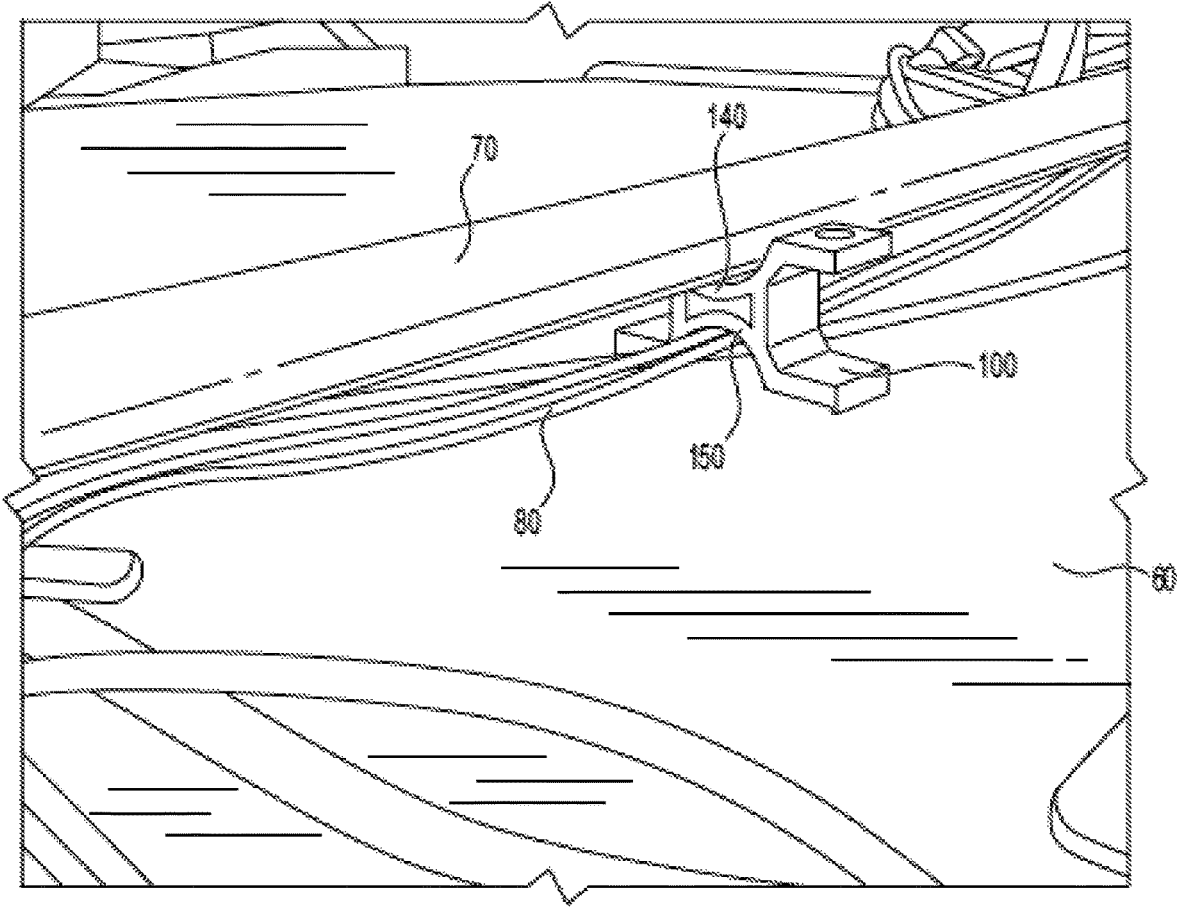
FIG. 3 is a perspective view of the support clip shown in FIG. 2 in use.

FIG. 2 shows an example of a gas line support device 100 in accordance with embodiments of the invention. Gas line support device 100 is attached to a surface 60 of a chassis of domestic home appliance 10. Gas line support device 100 supports a gas line 70 in a gas line cradle 140 above surface 60. Gas line support device 100 has a passage 150, positioned below gas line cradle 140, through which electrical wires 80 pass. As shown in FIG. 2, gas line support device 100 allows gas line 70 to pass over electrical wires 80 without contacting electrical wires 80. FIG. 3 shows another example in which gas line support device 100 allows gas line 70 to pass over electrical wires 80 without contacting electrical wires 80.

Figure 4:
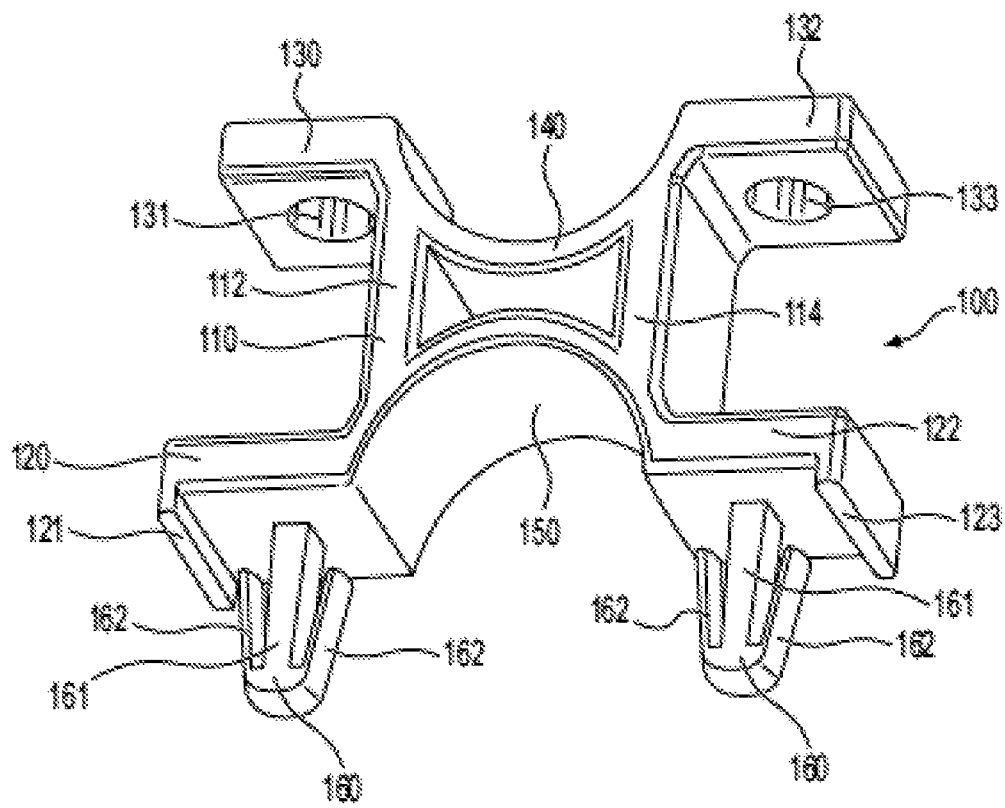
FIG. 4 is a perspective view of the support clip shown in FIG. 2.

FIG. 4 shows an example of gas line support device 100. In this example, gas line support device has a base having a first contact portion 120 and a second contact portion 122 that contact surface 60 of domestic home appliance 10. In this embodiment, first contact portion 120 has a protrusion 121 that elevates first contact portion 120 slightly above surface 60. Similarly, second contact portion 122 has a protrusion 123 that elevates second contact portion 122 slightly above surface 60. Also shown in FIG. 4 is a central portion 110 having two members 112, 114 that extend upwardly from first contact portion 120 and second contact portion 122. A gas line cradle 140 extends between members 112, 114 of central portion 110 and is configured to support gas line 70. In this example, gas line cradle 140 is semi-circular in shape to support the cylindrical shape to gas line 70. In other embodiments, gas line cradle 140 has a shape other than semi-circular. For example, gas line cradle 140 can be arch shaped, or another shape that supports a gas line. A first upper extension 130 extends from gas line cradle 140, and a second upper extension 132 extends from gas line cradle 140 in a direction opposite to that of first upper extension 130. In this example, first upper extension 130 has a hole 131 that is configured to receive an attachment portion such as, for example, attachment portion 160. In this example, second upper extension 132 has a hole 133 that is configured to receive an attachment portion such as, for example, attachment portion 160. As described below, holes 131, 133 provide for attachment of another gas line support device 100 (FIG. 9), a cap 300 (FIG. 11), or another device to the top of gas line support device 100.

FIG. 4 shows a passage 150 formed between first contact portion 120 and second contact portion 122. Passage 150 is configured to allow electrical wires 80 (or other features of domestic home appliance 10) to pass under gas line support device 100 and gas line 70. An attachment portion 160 extends from each of first contact portion 120 and second contact portion 122. Attachment portions 160 are configured to attach gas line support device 100 to surface 60. Attachment portions 160 can take various forms. In this example, each attachment portion 160 has a central post 161 that extends downward from contact portion 120, 122, and two resilient tabs 162 that extend at an angle from central post 161. When attachment portion 160 is inserted into a hole or other opening in surface 60, tabs 162 are pushed toward central post 161 to allow tabs 162 to fit into the opening. After tabs 162 are completely through the opening, tabs 162 spring outwardly away from central post 161. In this outwardly extended (rest) position, tabs 162 contact the underside of surface 60 and secure gas line support device 100 to surface 60. Other types of attachment portions, such as, for example, screws, circular barbs, or other shapes, can be used to attach gas line support device 100 to surface 60.

Figure 5:
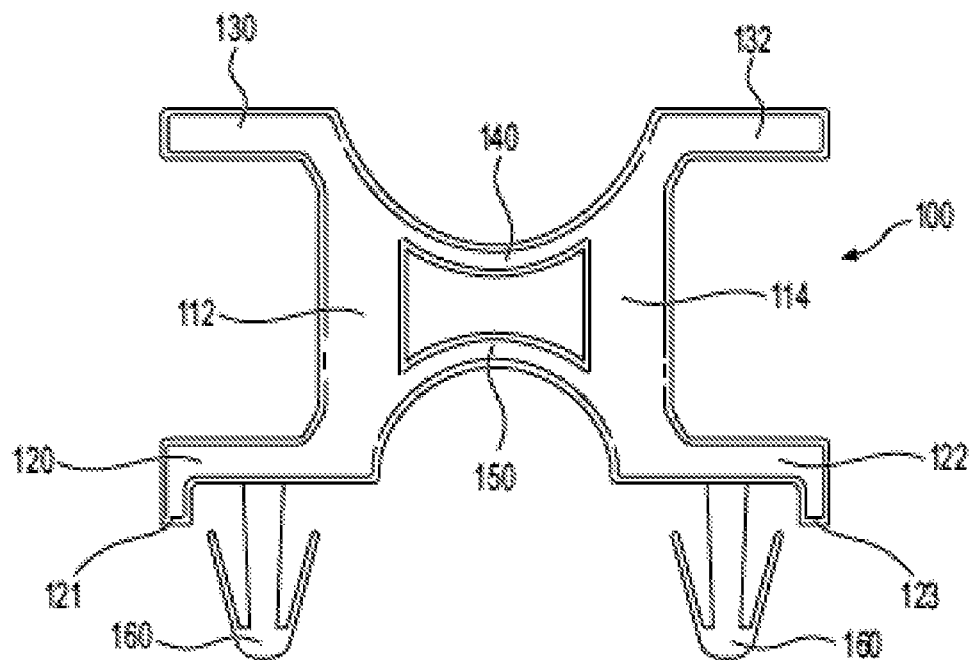
FIG. 5 is a front view of the support clip shown in FIG. 4.
Figure 6:
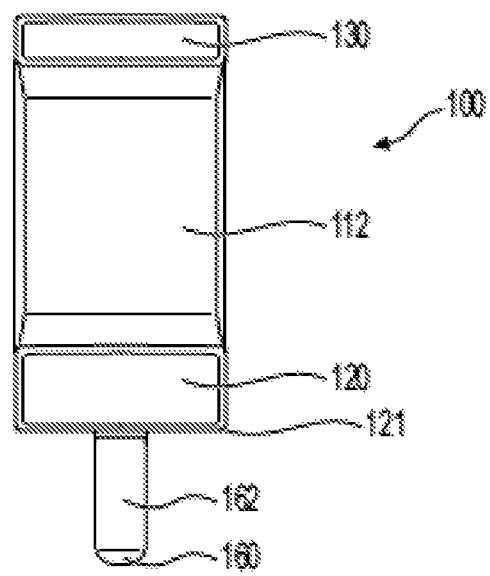
FIG. 6 is a side view of the support clip shown in FIG. 4.
Figure 7:
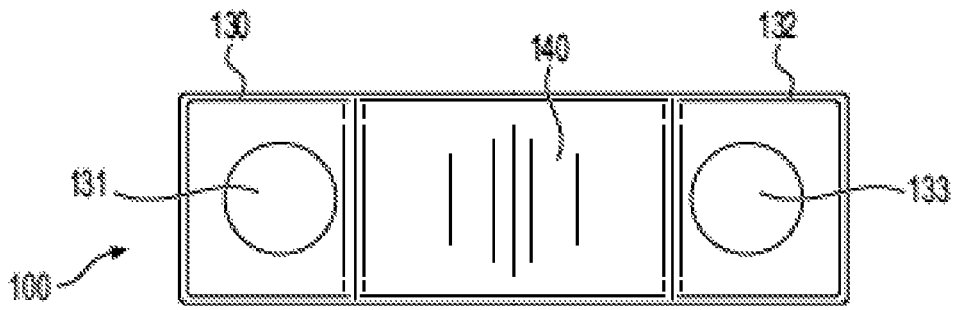
FIG. 7 is a top view of the support clip shown in FIG. 4.
Figure 8:
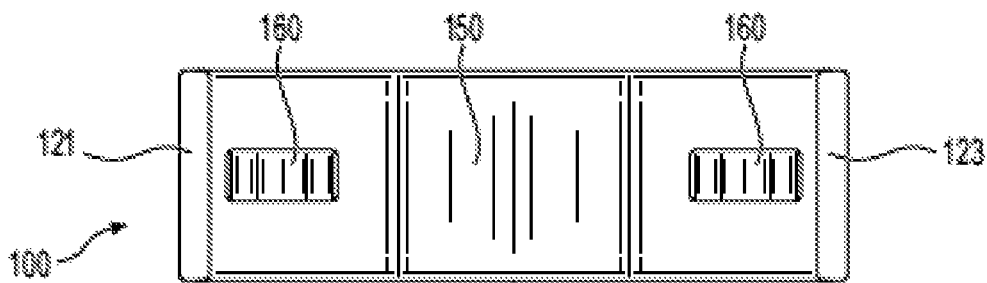
FIG. 8 is a bottom view of the support clip shown in FIG. 4.

FIG. 5 is a front view of gas line support device 100 and shows the semi-circular shape of both gas line cradle 140 and passage 150. In this example, central portion 110 has a hollow area between members 112, 114, gas line cradle 140, and passage 150. In other embodiments, central portion 110 is solid or has a different shape hollow area. FIG. 6 is a side view of gas line support device 100 and shows attachment portion 160 being centrally positioned on first contact portion 120. In other embodiments, attachment portion 160 is located on first contact portion 120 other than centrally. FIG. 7 is a top view of gas line support device 100 showing holes 131, 133 and gas line cradle 104. FIG. 8 is a bottom view of gas line support device 100 and shows two attachment portions 160 and passage 150.

Figure 9:
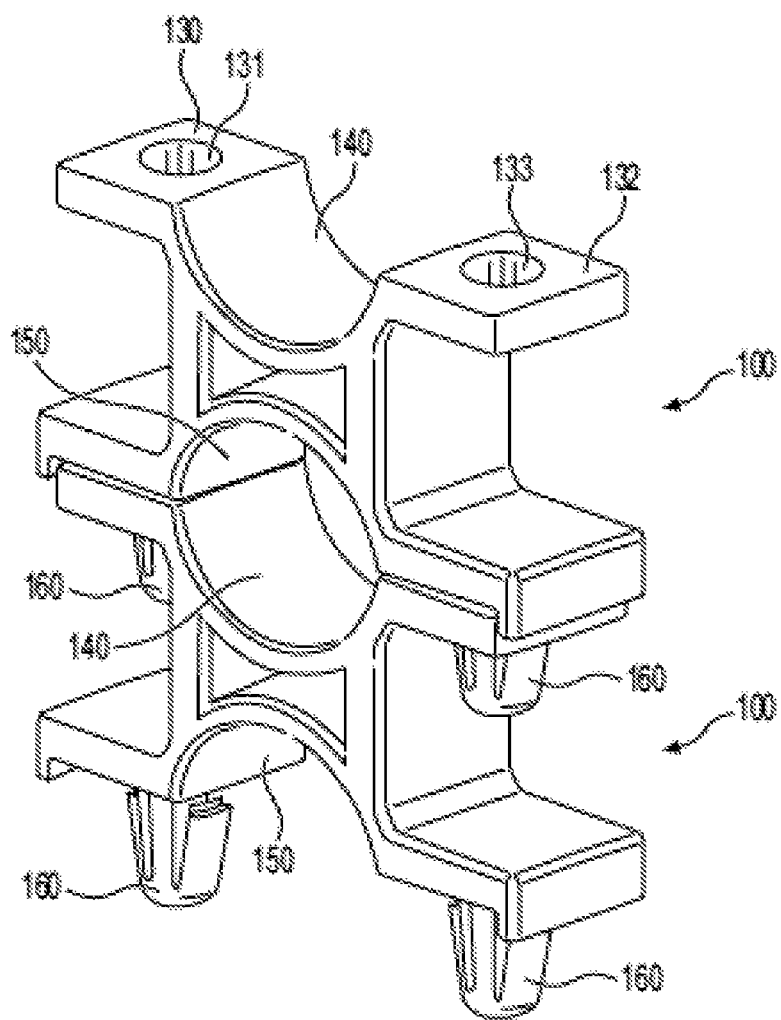
FIG. 9 is a perspective view of two of the one support clip shown in FIG. 4 in a stacked arrangement.

FIG. 9 shows a second two gas line support device 100 stacked on top of a first gas line support device 100. As shown in FIG. 9, attachment portions 160 of the upper gas line support device 100 extend through holes 131, 133 of the lower gas line support device 100 to connect the upper gas line support device 100 to the lower gas line support device 100. The gas line support devices can be separated by pinching tabs 162 and pushing them upward through the respective hole 131, 133 without damaging the device. In this stacked arrangement, a gas line or electrical wires (or another feature of domestic home appliance 10) can be supported in the area created by the gas line cradle 140 of the lower device 100 and the passage 150 of the upper device 100.

Figure 10:
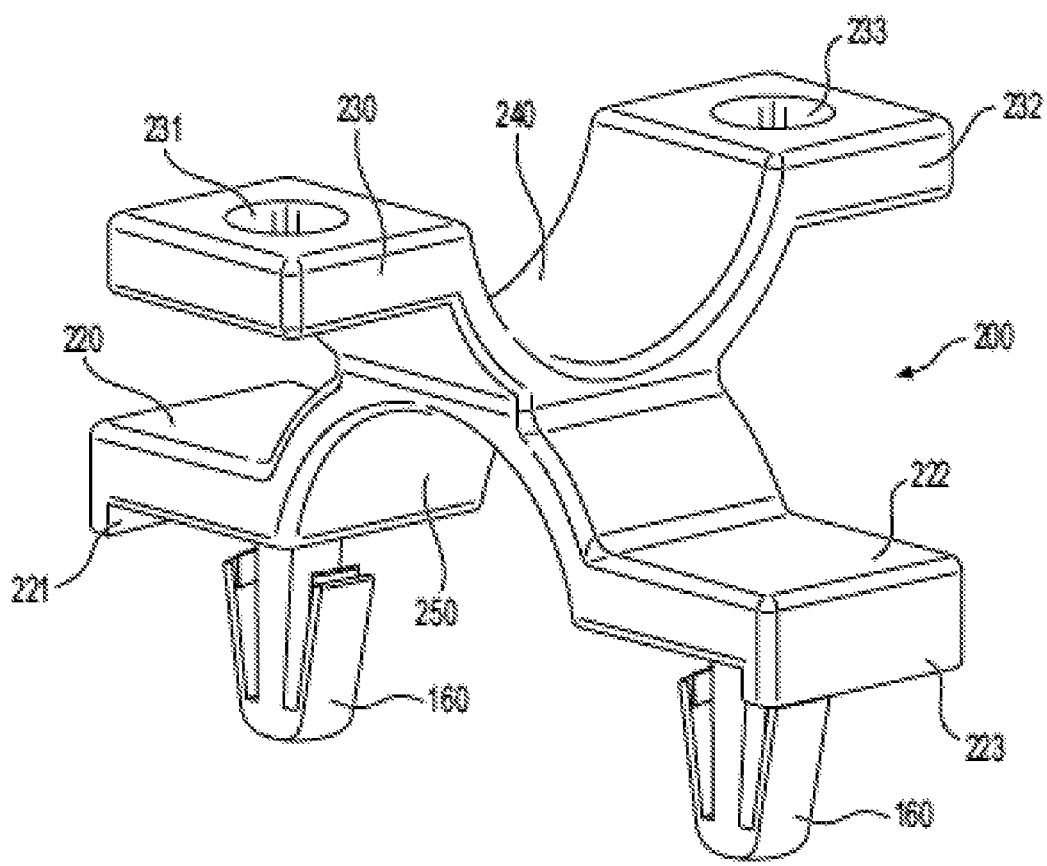
FIG. 10 is a perspective view of a support clip in accordance with embodiments of the invention.

FIG. 10 shows a gas line support device 200 in which a gas line cradle 240 has an axis that extends in a direction perpendicular to an axis of a passage 250. In this example, gas line support device 200 has a base having a first contact portion 220 and a second contact portion 222 that contact surface 60 of domestic home appliance 10. In this embodiment, first contact portion 220 has a protrusion 221 that elevates first contact portion 220 slightly above surface 60. Similarly, second contact portion 222 has a protrusion 223 that elevates second contact portion 222 slightly above surface 60. In this example, gas line cradle 240 is semi-circular in shape to support the cylindrical shape to gas line 70. In other embodiments, gas line cradle 240 has a shape other than semi-circular. For example, gas line cradle 240 can be arch shaped, or another shape that supports a gas line. A first upper extension 230 extends from gas line cradle 240, and a second upper extension 232 extends from gas line cradle 240 in a direction opposite to that of first upper extension 230. In this example, first upper extension 230 has a hole 231 that is configured to receive an attachment portion such as, for example, attachment portion 160. In this example, second upper extension 232 has a hole 233 that is configured to receive an attachment portion such as, for example, attachment portion 160. Holes 231, 233 provide for attachment of another gas line support device 100, 200, a cap 300 (FIG. 11), or another device to the top of gas line support device 100.

Figure 11:
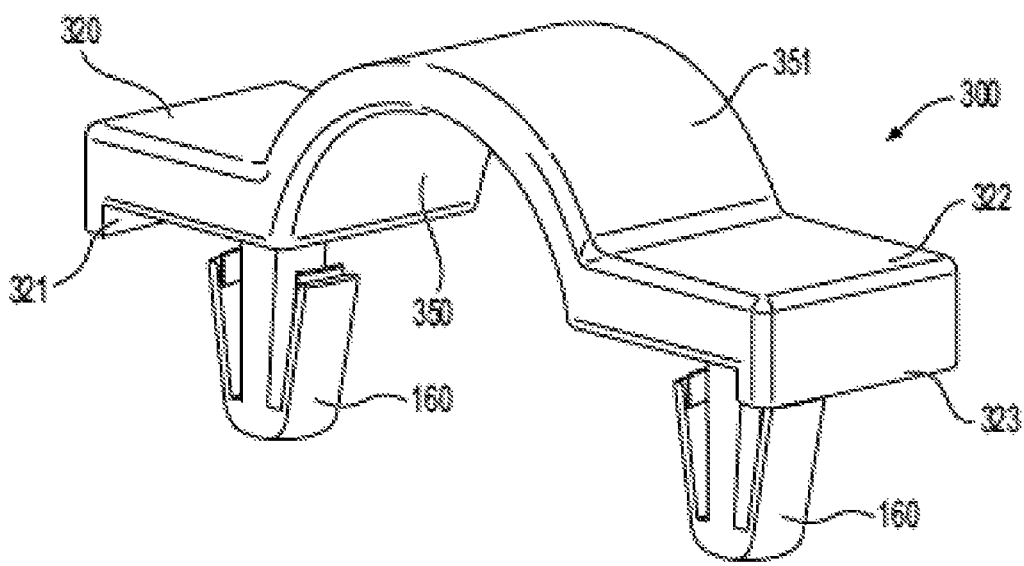
FIG. 11 is a perspective view of a cap in accordance with embodiments of the invention.

FIG. 10 shows a passage 250 formed between first contact portion 220 and second contact portion 222. Passage 250 is configured to allow electrical wires 80 (or other features of domestic home appliance 10) to pass under gas line support device 200 and gas line 70. An attachment portion 160 extends from each of first contact portion 120 and second contact portion FIG. 11 shows a cap 300 that can be attached to the top of gas line support device 100, 200. In this example, cap 300 has a first extension 320 and a second extension 322 that extend from a gas line retention portion 351. In this embodiment, first extension 320 has a protrusion 321 that elevates first extension 320 slightly above the upper extension of the gas line support device to which cap 300 is attached. Similarly, second extension 322 has a protrusion 323 that elevates second extension 322 slightly above the upper extension of the gas line support device to which cap 300 is attached. Protrusions 321, 323 can alternatively extend outside of the upper extensions to help locate extensions 320, 322 relative to the upper extensions. In this example, gas line retention portion 351 has a semi-circular retention shape 350 to fit the cylindrical shape of gas line 70. In other embodiments, retention shape 350 has a shape other than semi-circular. For example, retention shape 350 can be arch shaped, or another shape that fits a gas line. An attachment portion 160 extends from each of first extension 320 and second extension 322.

It will be appreciated that variants of the above-disclosed and other features and functions, or alternatives thereof, may be combined into many other different systems or applications. Any of the features described above can be combined with any other feature described above as long as the combined features are not mutually exclusive. Various presently unforeseen or unanticipated alternatives, modifications, variations or improvements therein may be subsequently made by those skilled in the art which are also intended to be encompassed by the invention.

What is claimed is:

1. A domestic home appliance, comprising:
a chassis;
a gas burner mounted to the chassis;
a gas supply line configured to supply a gas to the gas burner;
gas line support device configured to support the gas line in the domestic home appliance, the gas line support device comprising:
  a base, the base having a plurality of contact portions that rest on a surface in the chassis of the domestic home appliance;
  a central portion having a first end and a second end opposite the first end, the central portion being attached to the base at the first end of the central portion;
  a gas line cradle attached to the second end of the central portion, the gas line cradle supporting the gas supply line in the domestic home appliance;
  a passage in the base, the passage being formed between two of the contact portions of the base; and
  an attachment portion extending from one of the contact portions of the base, the attachment portion attaching the gas line support device to the surface; and
  an electrical wire extending through the passage and below the gas line cradle.

2. The domestic home appliance of claim 1, wherein the passage is arch shaped.

3. The domestic home appliance of claim 1, wherein the gas line cradle is a portion of a circle in shape.

4. The gas line support device of claim 3, wherein the gas line cradle is semi-circular.

5. The domestic home appliance of claim 1, wherein the attachment portion is a resilient clip.

6. The domestic home appliance of claim 5, further comprising a second attachment portion extending from another of the contact portions of the base, the second attachment portion being configured to attach the gas line support device to the surface.

7. The domestic home appliance of claim 1, wherein the plurality of contact portions comprises a first contact portion and a second contact portion, and
  the passage connects the first contact portion to the second contact portion.

8. The domestic home appliance of claim 7, further comprising a first upper extension extending from the gas line cradle in a first direction, and a second upper extension extending from the gas line cradle in a second direction opposite to the first direction.

9. The domestic home appliance of claim 8, further comprising a first attachment portion receiving area in the first upper extension, the first attachment portion receiving area being configured to receive a third attachment portion; and
  a second attachment portion receiving area in the second upper extension, the second attachment portion receiving area being configured to receive a fourth attachment portion.

10. The domestic home appliance of claim 9, wherein the first attachment portion, the second attachment portion, the third attachment portion, and the fourth attachment portion are identical.

11. The domestic home appliance of claim 10, further comprising a cap, the cap having a gas line retaining portion, a first tab extending from the gas line retaining portion in a third direction, a second tab extending from the gas line retaining portion in a fourth direction opposite to the third direction, the third attachment portion extending from the first tab, and the fourth attachment portion extending from the second tab.

12. The domestic home appliance of claim 11, wherein the gas line retaining portion is semi-circular.

13. The domestic home appliance of claim 8, wherein the first contact portion extends in the first direction, and the second contact portion extends in the second direction.

* * * * *